United States Patent [19]

Potucek et al.

[11] Patent Number: 5,684,609
[45] Date of Patent: Nov. 4, 1997

[54] D.C. OFFSET RESTORATION FOR IMAGE SCANNERS

[75] Inventors: Martin Potucek, Rochester; George Anthony Hadgis, Spencerport, both of N.Y.

[73] Assignee: Eastman Kodak Company, Rochester, N.Y.

[21] Appl. No.: 596,849

[22] Filed: Feb. 5, 1996

[51] Int. Cl.⁶ .............................. H04N 1/40; H04N 1/38; H04N 5/16
[52] U.S. Cl. .................... 358/482; 358/448; 358/461; 358/463; 382/274; 250/235; 348/257
[58] Field of Search .................... 358/410, 411, 358/412, 443, 447, 448, 461, 463, 465, 474, 482, 483, 406, 504; 382/274, 323; 250/234, 235; 348/241, 245, 248, 249, 250, 257, 251, 689, 691, 694, 696

[56] References Cited

U.S. PATENT DOCUMENTS

| | | | |
|---|---|---|---|
| 4,562,475 | 12/1985 | Levine | 358/213 |
| 4,903,144 | 2/1990 | Stefanik et al. | 358/461 |
| 5,038,225 | 8/1991 | Maeshima | 358/461 |
| 5,204,761 | 4/1993 | Gusmano | 358/461 |
| 5,241,404 | 8/1993 | Furukawa et al. | 358/466 |

*Primary Examiner*—Edward L. Coles, Sr.
*Assistant Examiner*—Kimberly A. Williams
*Attorney, Agent, or Firm*—Nelson A. Blish

[57] ABSTRACT

A scanner having a photosensitive scanning array includes a timing generator having (a) a first state wherein pixel clock signals with a predetermined frequency are produced and (b) a second state wherein a D.C. restore clock signal with a frequency that is "N" times slower than the predetermined frequency is produced. The timing generator controls the rate of sampling the scanning array to acquire image data by producing a series of analog image signals containing (a) a video component which is characteristic of a density pattern of a scanned image and (b) a D.C. offset component which is characteristic of the scanning array. The timing generator also controls the rate of sampling the scanning array to acquire an analog signal containing only the D.C. offset component. A D.C. restore calculates an output signal containing only the video component of the series of analog image signals containing the video component and the D.C. offset component. The timing generator is selectively switched to its first state during acquisition of the image data, and to its second state during acquisition of the analog signal containing only the D.C. offset component.

10 Claims, 3 Drawing Sheets

D.C. OFFSET RESTORATION FOR IMAGE SCANNERS

BACKGROUND OF THE INVENTION

1. Technical Field

This invention relates generally to the restoration of image signals from a photosensitive scanning array to provide an absolute output signal level, and more particularly to the provision of an automatic offset control of the signals from the array.

2. Background Art

Document scanners often employ devices which capture the optical image and convert the information to an analog output signal. Often, the devices comprise an array of charge coupled devices (CCDs), but it will be understood that other technologies may be used to convert the optical image to an analog output signal. Accordingly, this specification will refer to such devices generally as "photosensitive scanning arrays" and will describe a preferred embodiment wherein the photosensitive scanning array is a CCD.

The photosensitive scanning array output signal contains a desired video component that is attributable to the exposure of the photosensitive scanning array to light. However, the output signal also contains an unwanted D.C. offset component that is attributable to the inherent operating characteristics of the photosensitive scanning array. It is necessary to amplify the desired video component of the output signal and to remove the unwanted D.C. component. This is referred to as "D.C. offset restoration."

In one known technique for D.C. offset restoration of a signal, optically black pixels ("dark" cells) on the photosensitive scanning array are periodically sampled. An average of scanned values from the output of "dark" cells is used to calculate an offset voltage to be subtracted from the photosensitive scanning array output signal. The difference signal is then scaled to the full dynamic range of an analog-to-digital converter.

At relatively slow pixel clock rates, such as that which would produce a video data rate of, say, ten Mpixels per second, conventional D.C. restoration circuitry has sufficient time to accurately acquire and compensate for the D.C. level of the video output. However, as throughput requirements for high speed document scanning increase, the rate at which video data must be output also increases. The increase in video data rates results in having less time available to accurately acquire and compensate for the D.C. level of the optically black pixels.

One straight forward solution to this problem would be to use higher speed components. For example, the time required to charge the capacitor of an RC circuit can be reduced by decreasing the capacitance value of the circuit. However, as the capacitance decreases, leakage current becomes a problem requiring expensive, low-leakage capacitors in conjunction with a high input impedance amplifier.

DISCLOSURE OF THE INVENTION

It is an object of the present invention to provide a cost effective D.C. offset restoration system which allows sufficient time to capture the D.C. component of the device output signal, without significantly effecting the total integration time of the system.

It is another object of the present invention to provide a slower pixel clock rate during the sampling of pixel dark cells to provide more time for the D.C. restoration circuitry to accurately establish and correct the D.C. offset level, and a faster pixel clock rate during acquisition of the image data.

It is still another object of the present invention to slow the photosensitive scanning array clock during the sampling of the pixels to provide more time for the D.C. restoration circuitry to accurately establish and correct the D.C. offset level without significantly effecting the total integration time of the photosensitive scanning array.

According to these and other objects of the present invention, a scanner having a photosensitive scanning array includes a timing clock generator having (a) a first state wherein pixel clock signals with a predetermined frequency are produced and (b) a second state wherein a D.C. restore clock signal with a frequency that is "N" times slower than the predetermined frequency is produced. The timing generator controls the rate of sampling the scanning array to acquire image data by producing a series of analog image signals containing (a) a video component which is characteristic of a density pattern of a scanned image and (b) a D.C. offset component which is characteristic of the scanning array. The timing generator also controls the rate of sampling the scanning array to acquire an analog signal containing only the D.C. offset component. A D.C. restore calculates an output signal containing only the video component of the series of analog image signals containing the video component and the D.C. offset component. The timing generator is selectively switched to its first state during acquisition of the image data, and to its second state during acquisition of the analog signal containing only the D.C. offset component.

According to a feature of a preferred embodiment of the present invention, the predetermined frequency of the D.C. restore clock signal produces a video data rate of at least about 10 Mpixels per second. The scanning array includes pixel dark cells, and the D.C. restore which calculates an output signal subtracts the analog signal containing only the D.C. offset component from the analog image signal to produce a difference signal. The timing generator including a divide-by-N circuit which is selectively operable to decrease the frequency of the timing pulses by a factor of N.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
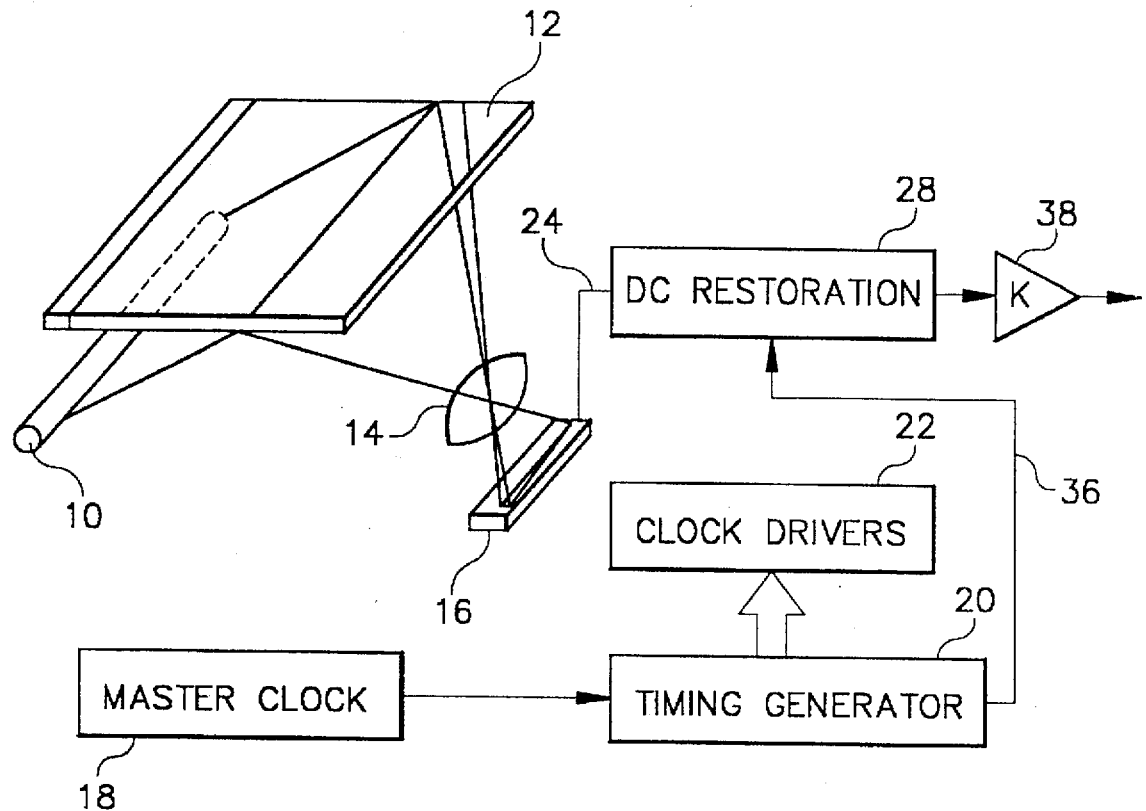
FIG. 1 is a schematic view of a scanning system including a D.C. offset restoration system according to a preferred embodiment of the present invention.

Referring to FIG. 1, a light source 10 illuminates an original image on top of a platen surface 12. Light is reflected from the original document, through a lensing means 14 onto a photosensitive scanning array, such as a CCD 16. A master clock 18 drives a timing generator 20 which emits a series of pixel clock signals to clock drivers 22, causing the CCD to convert the original image to a series of analog image signals on an output 24 as the original image is scanned in the in-track direction to cause reflected light from different areas of the original image to become focused on the CCD.

Figure 2:
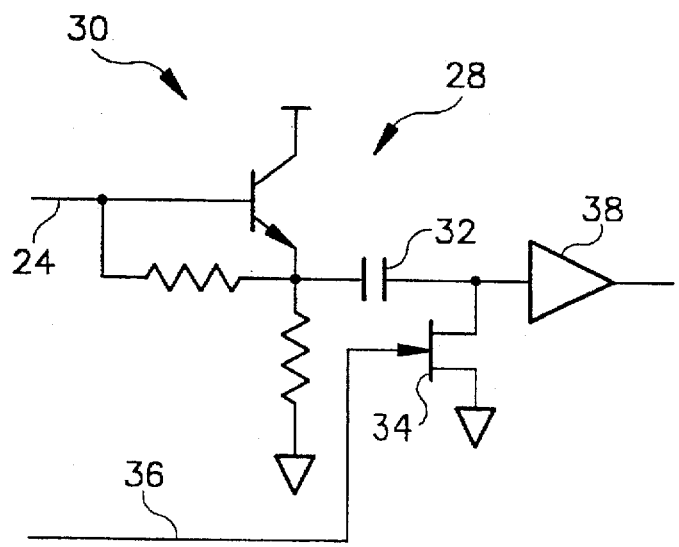
FIG. 2 is a more detailed block diagram of the D.C. offset restoration system of FIG. 1.

The analog signal on output 24 comprises a desired video component and an unwanted D.C. offset component. The analog output signal is output to a D.C. restoration 28, which is shown in greater detail in FIG. 2. An emitter follower circuit 30 has a gain of one, and has a low output impedance. The output of the emitter follower circuit is passed through a D.C. restore capacitor 32. The output from pixel dark cells of CCD 16 (FIG. 1) are periodically sampled, and the average value of the sampled output is stored. During the sampling of the dark reference cells, D.C. restore capacitor 32 is charged and discharged by switching a D.C. restore transistor 34 ON and OFF, using a D.C. restore clock signal 36 from timing generator 20 of FIG. 1.

An amplifier 38 is used to increase the signal level of the video. Amplifier 38 has a high input impedance to prevent any unwanted charging and discharging of D.C. restore capacitor 32. The output of amplifier 38 is inputted to an analog-to-digital converter, not shown, which is driven by pixel clock signals from timing generator 20.

Figure 3:
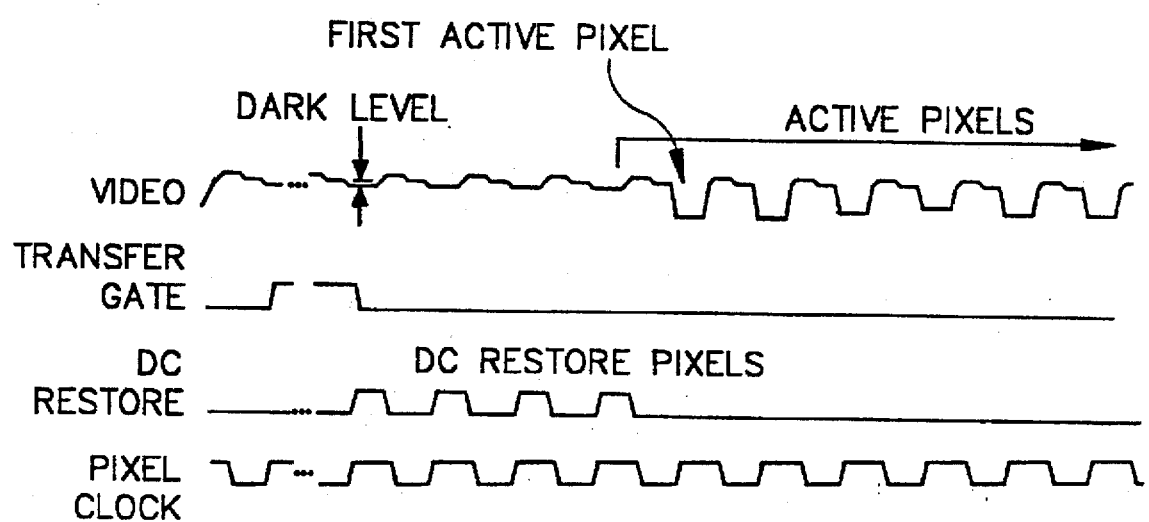
FIG. 3 is a timing diagram for a typical scanning system.

FIG. 3 illustrates a typical timing diagram for a CCD. At relatively slow pixel clock rates, such as that which would produce a video data rate of, say, ten Mpixels per second, the D.C. restoration circuitry has sufficient time to accurately acquire and compensate for the D.C. level of the video output. However, as throughput requirements for high speed document scanning increase, the rate at which video data must be output also increases. The increase in video data rates results in having less time available to accurately acquire and compensate for the D.C. level of the optically black pixels.

Figure 4:
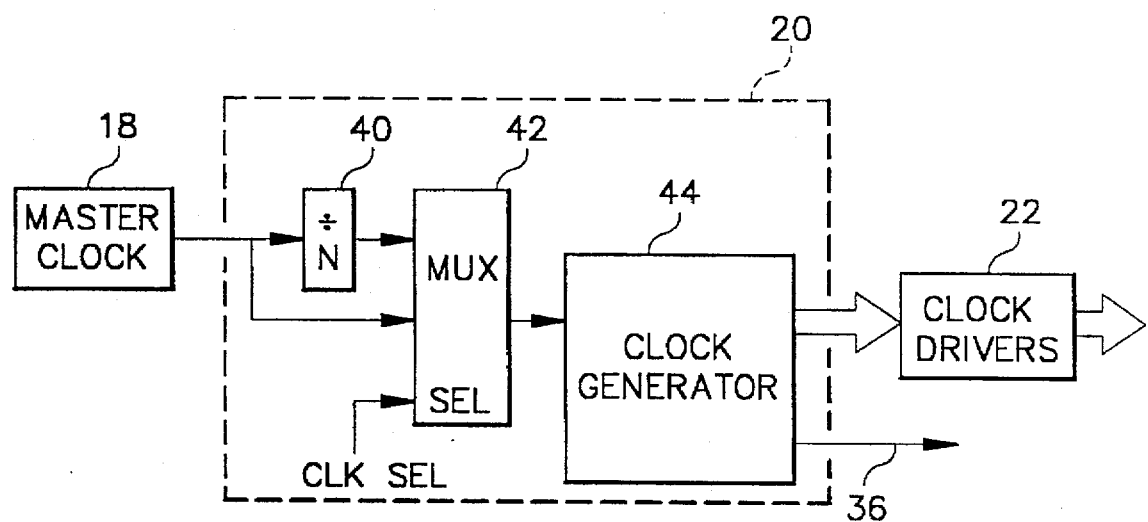
FIG. 4 is a more detailed block diagram of a portion of the D.C. offset restoration system of FIG. 1.

Referring to FIG. 4, timing generator 20 of FIG. 1 includes a divide-by-N circuit 40 which can be used to decrease the frequency of the signal from master clock 18 by a factor "N". Selectively, and under the control of a multiplexer 42, which is switched by a clock select signal CLK SEL, the master clock signal may be inputted to a clock generator 44 without decrease.

Figure 5:
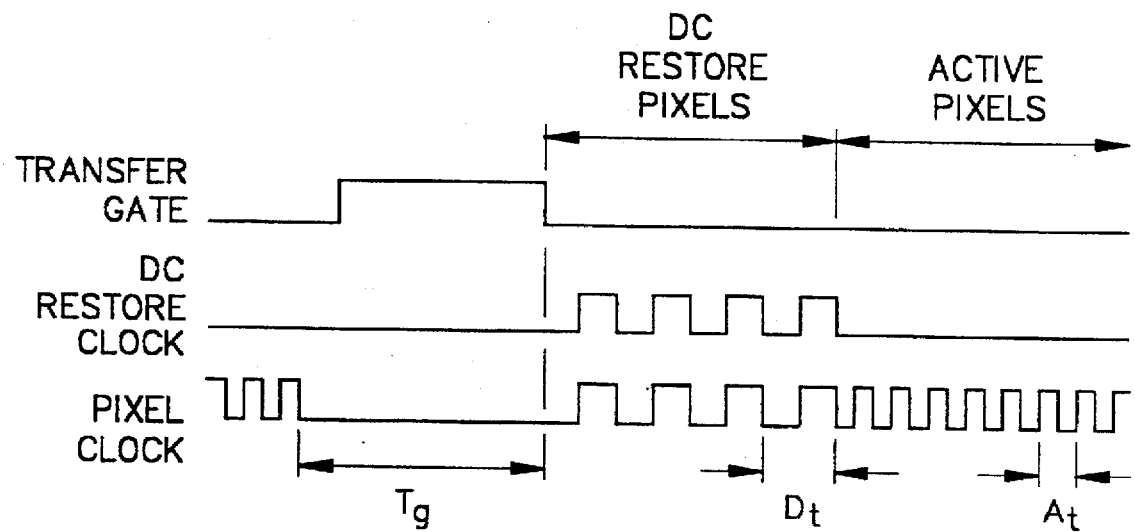
FIG. 5 is a D.C. restoration timing diagram according to the present invention.

FIG. 5 shows a D.C. restoration timing diagram according to the present invention wherein the D.C. restore clock frequency is reduced by a factor of "N" during the optically black pixels. In the figure:

$$I = D_n * D_f + A_n * A_f + T_g$$

where:
I=integration time of sensor
$D_n$=number of DC restoration pixels
$D_f$=period of a DC restoration pixel
$A_n$=number of active pixels
$A_f$=period of an active pixel
$T_g$=charge transfer time of CCD It can be seen that by reducing the clock frequency by a factor of "N" during the optically black pixels, "N" times more time is available to properly charge and discharge D.C. restore capacitor 32 of FIG. 2. Even though substantially more time is available during the optically black pixels, the method does not significantly effect the total integration time of the system. For illustrative purposes, suppose the following variable assignments are made:

| The traditional method | The present invention |
| --- | --- |
| $D_n$ = 4 pixels | $D_n$ = 4 pixels |
| $D_t$ = 40 nsec | $D_t$ = 80 nsec |
| $A_n$ = 4096 pixels | $A_n$ = 4096 pixels |
| $A_t$ = 40 nsec | $A_t$ = 40 nsec |
| $T_g$ = 1 msec | $T_g$ = 1 msec |

Now, $D_t$ is double the value of $A_t$. In general, $D_t$ could be N times $A_t$, where N may be an integer, and is greater than one. The effect on the sensor integration time in the process according to the present invention results in an integration time of 1,164.16 msec. while the traditional method results in an integration time of 1,164.00 msec. Thus, the clocking scheme of the present invention will change the integration time by only approximately 0.01% while doubling the time allowed to capture the offset reference voltage level.

The invention has been described in detail with particular reference to preferred embodiments thereof, but it will be understood that variations and modifications can be effected within the spirit and scope of the invention. For example, a platen exposure system is illustrated, but other systems such as a rotating or planetary scanner may be used.

What is claimed is:

1. A scanner having a photosensitive scanning array, said scanner comprising:
   a timing generator having:
   (a) a first state wherein pixel clock signals with a predetermined frequency are produced, and
   (b) a second state wherein a D.C. restore clock signal with a frequency that is "N" times slower than the predetermined frequency is produced and the frequency of the pixel clock signal is reduced to "N" times slower than the predetermined frequency;
   means driven by the timing generator for sampling the scanning array to acquire image data by producing a series of analog image signals containing:
   (a) a video component which is characteristic of a density pattern of a scanned image, and
   (b) a D.C. offset component which is characteristic of the scanning array;
   means driven by the timing generator for sampling the scanning array to acquire an analog signal containing only the D.C. offset component;
   a D.C. restore which calculates an output signal containing only the video component of the series of analog image signals containing the video component and the D.C. offset component; and
   means associated with the timing generator for selectively switching the timing generator:
   (a) to its first state during acquisition of the image data, and
   (b) to its second state during acquisition of the analog signal containing only the D.C. offset component.

2. A scanner as set forth in claim 1 wherein the predetermined frequency of the pixel clock signals produces a video data rate of at least about 10 Mpixels per second.

3. A scanner as set forth in claim 1 wherein:
   the scanning array includes pixel dark cells; and
   the means for sampling the scanning array to acquire an analog signal containing only the D.C. offset component includes means for periodically sampling the pixel dark cells of the scanning array.

4. A scanner as set forth in claim 1 wherein the D.C. restore which calculates an output signal subtracts the analog signal containing only the D.C. offset component from the analog image signal to produce a difference signal.

5. A scanner as set forth in claim 1:

further comprising a master clock adapted to produce a series of timing pulses of said predetermined frequency, and wherein the D.C. restore clock generator comprises a timing generator including a divide-by-N circuit which is selectively operable to decrease the frequency of the timing pulses by a factor of N.

6. A scanner as set forth in claim 1 wherein the frequency of the pixel clock signals during the second state is substantially equal to the frequency of the D.C. restore clock signals during the second state.

7. A process for producing a photosensitive scanning array output signal, said process comprising:

sampling the scanning array at a first predetermined frequency to acquire image data by producing a series of analog image signals containing:

(a) a video component which is characteristic of a density pattern of a scanned image, and (b) a D.C. offset component which is characteristic of the scanning array;

sampling the scanning array at a second frequency that is "N" times slower than the predetermined frequency to acquire an analog signal containing only the D.C. offset component, and calculating an output signal containing only the video component of the series of analog image signals containing the video component and the D.C. offset component.

8. A process as set forth in claim 7 wherein the predetermined frequency produces a video data rate of at least about 10 Mpixels per second.

9. A process as set forth in claim 7 wherein:

the scanning array includes pixel dark cells; and the step of sampling the scanning array to acquire an analog signal containing only the D.C. offset component includes periodically sampling the pixel dark cells of the scanning array.

10. A process as set forth in claim 7 wherein the step of calculating an output signal includes subtracting the analog signal containing only the D.C. offset component from the analog image signal to produce a difference signal.

* * * * *